US009011249B2

(12) United States Patent
Gagner et al.

(10) Patent No.: US 9,011,249 B2
(45) Date of Patent: Apr. 21, 2015

(54) METHOD AND APPARATUS FOR USE OF MOVEMENT AND POSITION SENSORS WITH PORTABLE HANDHELD WAGERING DEVICES

(75) Inventors: Mark B. Gagner, West Chicago, IL (US); Vernon Hamlin, Lisle, IL (US); Alfred Thomas, Las Vegas, NV (US); Muthu Velu, Addison, IL (US)

(73) Assignee: WMS Gaming Inc., Waukegan, IL (US)

( * ) Notice: Subject to any disclaimer, the term of this patent is extended or adjusted under 35 U.S.C. 154(b) by 1259 days.

(21) Appl. No.: 12/307,031

(22) PCT Filed: Jun. 29, 2007

(86) PCT No.: PCT/US2007/015240
§ 371 (c)(1),
(2), (4) Date: Dec. 30, 2008

(87) PCT Pub. No.: WO2008/005389
PCT Pub. Date: Jan. 10, 2008

(65) Prior Publication Data

US 2009/0280910 A1 Nov. 12, 2009

Related U.S. Application Data

(60) Provisional application No. 60/818,132, filed on Jun. 30, 2006.

(51) Int. Cl.
*G06F 17/00* (2006.01)
*G06F 19/00* (2011.01)
*G07F 17/32* (2006.01)

(52) U.S. Cl.
CPC ............ *G07F 17/32* (2013.01); *G07F 17/3274* (2013.01); *G07F 17/3209* (2013.01); *G07F 17/3218* (2013.01)

(58) Field of Classification Search
CPC .......................... G07F 17/3209; G07F 17/3218
USPC ............... 463/38, 20, 42, 43, 25, 36, 16, 362; 345/1.1
See application file for complete search history.

(56) References Cited

U.S. PATENT DOCUMENTS 4,455,025 A 6/1984 Itkis .............................. 273/237
4,624,462 A 11/1986 Itkis .............................. 273/237
(Continued)

FOREIGN PATENT DOCUMENTS

WO WO2004000428 A1 12/2003
WO WO2005035086 A1 4/2005
(Continued)

OTHER PUBLICATIONS

International Search Report in International Publication No. PCT/US07/015240, dated Aug. 20, 2008 (2 pages).
(Continued)

*Primary Examiner* — Steven J Hylinski
(74) *Attorney, Agent, or Firm* — Nixon Peabody LLP

(57) ABSTRACT

A gaming system includes a handheld gaming machine configured to play at least one wagering game, a wager input device for receiving a wager to play a wagering game, and a controller operative to process signals output from a movement sensor. A movement sensor is disposed in the handheld gaming machine to sense movements of the handheld gaming machine and/or a sub-portion thereof and to output signals relating to the movements to the controller.

24 Claims, 10 Drawing Sheets

(56) References Cited

U.S. PATENT DOCUMENTS

| | | | | |
|---|---|---|---|---|
| 5,102,138 | A | 4/1992 | Johnson | 273/144 B |
| 5,618,232 | A | 4/1997 | Martin | 463/25 |
| 6,001,016 | A | 12/1999 | Walker et al. | 463/42 |
| 6,012,983 | A | 1/2000 | Walker et al. | 463/20 |
| 6,104,815 | A | 8/2000 | Alcorn et al. | 380/251 |
| 6,117,013 | A | 9/2000 | Eiba | 463/41 |
| 6,267,669 | B1 * | 7/2001 | Luciano et al. | 463/7 |
| 6,270,410 | B1 * | 8/2001 | DeMar et al. | 463/20 |
| 6,409,602 | B1 | 6/2002 | Wiltshire et al. | 463/42 |
| 6,508,710 | B1 | 1/2003 | Paravia et al. | 463/42 |
| 6,527,638 | B1 | 3/2003 | Walker et al. | 463/25 |
| 6,628,939 | B2 | 9/2003 | Paulsen | |
| 6,665,715 | B1 | 12/2003 | Houri | 709/223 |
| 6,676,522 | B2 | 1/2004 | Rowe et al. | 463/42 |
| 6,682,421 | B1 | 1/2004 | Rowe et al. | 463/25 |
| 6,800,029 | B2 | 10/2004 | Rowe et al. | 463/25 |
| 6,843,725 | B2 | 1/2005 | Nelson | 463/40 |
| 6,846,238 | B2 | 1/2005 | Wells | 463/39 |
| 6,887,151 | B2 | 5/2005 | Leen et al. | 463/16 |
| 6,908,388 | B2 * | 6/2005 | Shimizu et al. | 463/31 |
| 6,923,724 | B2 | 8/2005 | Williams | 463/42 |
| 6,935,952 | B2 | 8/2005 | Walker et al. | 463/25 |
| 6,971,956 | B2 | 12/2005 | Rowe et al. | 463/25 |
| 7,601,066 | B1 * | 10/2009 | Masuyama et al. | 463/38 |
| 7,967,682 | B2 * | 6/2011 | Huizinga | 463/42 |
| 8,628,418 | B2 * | 1/2014 | Abbott | 463/40 |
| 8,858,332 | B2 * | 10/2014 | Arezina et al. | 463/37 |
| 2002/0068631 | A1 | 6/2002 | Raverdy et al. | 463/42 |
| 2002/0086729 | A1 | 7/2002 | Emmerson et al. | 463/41 |
| 2002/0140625 | A1 * | 10/2002 | Kidney et al. | 345/1.1 |
| 2002/0147047 | A1 | 10/2002 | Letovsky et al. | 463/42 |
| 2002/0147049 | A1 | 10/2002 | Carter | 463/42 |
| 2002/0151363 | A1 | 10/2002 | Letovsky et al. | 463/40 |
| 2002/0167699 | A1 * | 11/2002 | Verplaetse et al. | 359/158 |
| 2002/0183107 | A1 | 12/2002 | Wolfe | 463/17 |
| 2003/0006931 | A1 * | 1/2003 | Mages | 342/357.06 |
| 2003/0008703 | A1 * | 1/2003 | Gauselmann | 463/20 |
| 2003/0027619 | A1 * | 2/2003 | Nicastro, Sr. | 463/16 |
| 2003/0064805 | A1 * | 4/2003 | Wells | 463/39 |
| 2003/0104865 | A1 * | 6/2003 | Itkis et al. | 463/39 |
| 2003/0139190 | A1 | 7/2003 | Steelberg et al. | 455/1 |
| 2003/0153375 | A1 * | 8/2003 | Vancura | 463/11 |
| 2003/0224855 | A1 | 12/2003 | Cunningham | 463/41 |
| 2003/0232651 | A1 * | 12/2003 | Huard et al. | 463/42 |
| 2004/0002380 | A1 * | 1/2004 | Brosnan et al. | 463/32 |
| 2004/0087370 | A1 | 5/2004 | Tarantino | 463/42 |
| 2004/0137987 | A1 | 7/2004 | Nguyen et al. | 463/42 |
| 2004/0140989 | A1 | 7/2004 | Papageorge | 715/700 |
| 2004/0162124 | A1 | 8/2004 | Barton | 463/1 |
| 2004/0166937 | A1 * | 8/2004 | Rothschild et al. | 463/36 |
| 2004/0193431 | A1 | 9/2004 | Campbell | 705/39 |
| 2004/0224769 | A1 | 11/2004 | Hansen et al. | 463/40 |
| 2005/0003883 | A1 | 1/2005 | Muir et al. | 463/16 |
| 2005/0009600 | A1 | 1/2005 | Rowe et al. | 463/29 |
| 2005/0026697 | A1 | 2/2005 | Balahura et al. | 463/42 |
| 2005/0037708 | A1 | 2/2005 | Torvinen | 455/41.2 |
| 2005/0054405 | A1 * | 3/2005 | Baerlocher et al. | 463/9 |
| 2005/0130728 | A1 | 6/2005 | Nguyen et al. | 463/16 |
| 2005/0170881 | A1 * | 8/2005 | Muskin | 463/20 |
| 2005/0187020 | A1 | 8/2005 | Amaitis | 463/42 |
| 2005/0193209 | A1 | 9/2005 | Saunders et al. | 718/182 |
| 2005/0197190 | A1 | 9/2005 | Amaitis | 463/42 |
| 2005/0227770 | A1 * | 10/2005 | Papulov | 463/42 |
| 2006/0035707 | A1 | 2/2006 | Nguyen | 463/29 |
| 2006/0189382 | A1 | 8/2006 | Muir | 463/29 |
| 2007/0021198 | A1 | 1/2007 | Muir | 463/29 |
| 2007/0054739 | A1 | 3/2007 | Amaitis | 463/42 |
| 2007/0060305 | A1 | 3/2007 | Amaitis et al. | 463/25 |
| 2007/0060306 | A1 | 3/2007 | Amaitis et al. | 463/25 |
| 2007/0060355 | A1 | 3/2007 | Amaitis et al. | 463/40 |
| 2007/0060358 | A1 | 3/2007 | Amaitis et al. | 463/42 |
| 2007/0066401 | A1 | 3/2007 | Amaitis et al. | 463/42 |
| 2007/0066402 | A1 | 3/2007 | Amaitis et al. | 463/42 |
| 2009/0005165 | A1 | 1/2009 | Arezina et al. | 463/37 |
| 2009/0197684 | A1 | 8/2009 | Arezina et al. | 463/42 |

FOREIGN PATENT DOCUMENTS

| | | | |
|---|---|---|---|
| WO | WO2005086399 | A1 | 9/2005 |
| WO | WO2007008713 | A2 | 1/2007 |
| WO | WO2007022256 | A2 | 2/2007 |

OTHER PUBLICATIONS

Written Opinion of the International Searching Authority in International Publication No. PCT/US07/015240, dated Aug. 20, 2008 (3 pages).

International Preliminary Report of Patentability in International Publication No. PCT/US07/015240, dated Jan. 15, 2009 (4 pages).

"The Sudden Motion Sensor" by Amit Singh, dated Feb. 2005. http://osxbook.com/book/bonus/chapter10sms/.

* cited by examiner

METHOD AND APPARATUS FOR USE OF MOVEMENT AND POSITION SENSORS WITH PORTABLE HANDHELD WAGERING DEVICES

CROSS REFERENCE TO RELATED APPLICATIONS

This application is a U.S. national phase of International Application No. PCT/US2007/015240 filed Jun. 29, 2007, and claims the benefit of priority of U.S. Provisional Application Ser. No. 60/818,132, filed Jun. 30, 2006, which is incorporated by reference in its entirety herein.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a handheld gaming system and methods for playing wagering games thereon.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

According to one aspect of the present invention, a gaming system for conducting a wagering game includes a handheld gaming machine configured to play at least one wagering game, a wager input device for receiving a wager to play a wagering game, and a controller operative to process signals output from a movement sensor. A movement sensor is disposed in the handheld gaming machine to sense movements of the handheld gaming machine and/or a sub-portion thereof and to output signals relating to the movements to the controller.

According to another aspect of the invention, a method of conducting a wagering game on a handheld gaming machine configured to play a wagering game, comprises the acts of moving the handheld gaming machine and/or a sub-portion thereof, outputting from a movement sensor disposed in the handheld gaming machine a signal corresponding to the act of moving. The method also includes the acts of determining a characteristic of movement represented by the signal and controlling movement of a player-controllable object in the wagering game responsive to the characteristic of movement.

According to yet another aspect of the invention, a computer readable storage medium is encoded with instructions for directing a gaming system to perform the above method.

In still another aspect, a method of conducting a wagering game on a handheld gaming machine configured to play a wagering game includes moving a first handheld gaming machine or a sub-portion thereof to output a signal corresponding to the act of moving from a movement sensor disposed in a corresponding one of the first handheld gaming machine or sub-portion thereof. The method also includes determining a characteristic of movement represented by the signal, controlling movement of a player-controllable object in the wagering game responsive to the characteristic of movement, and passing the player-controllable object in the wagering game to a second handheld gaming machine responsive to an output signal having a predetermined association with a passing function.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
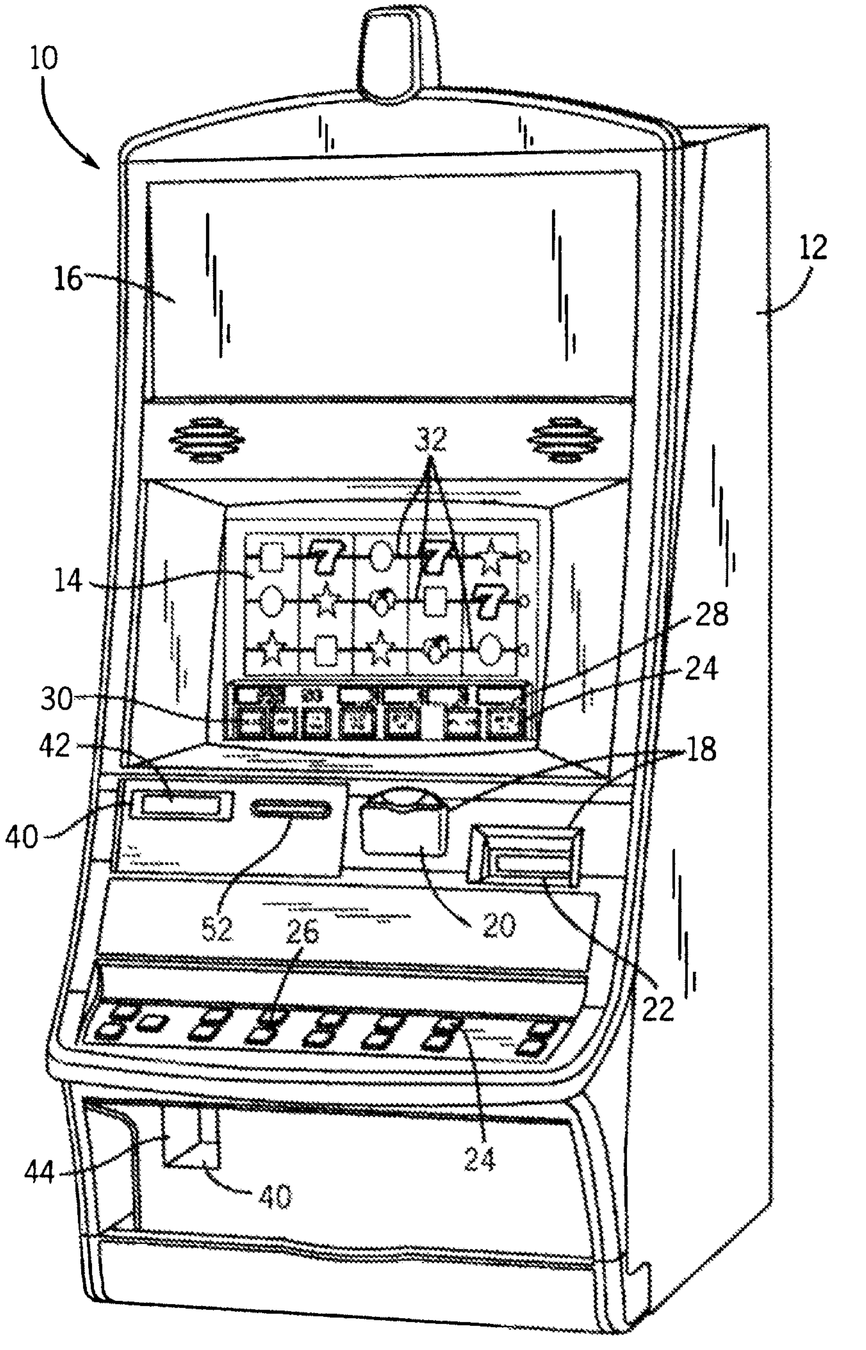
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
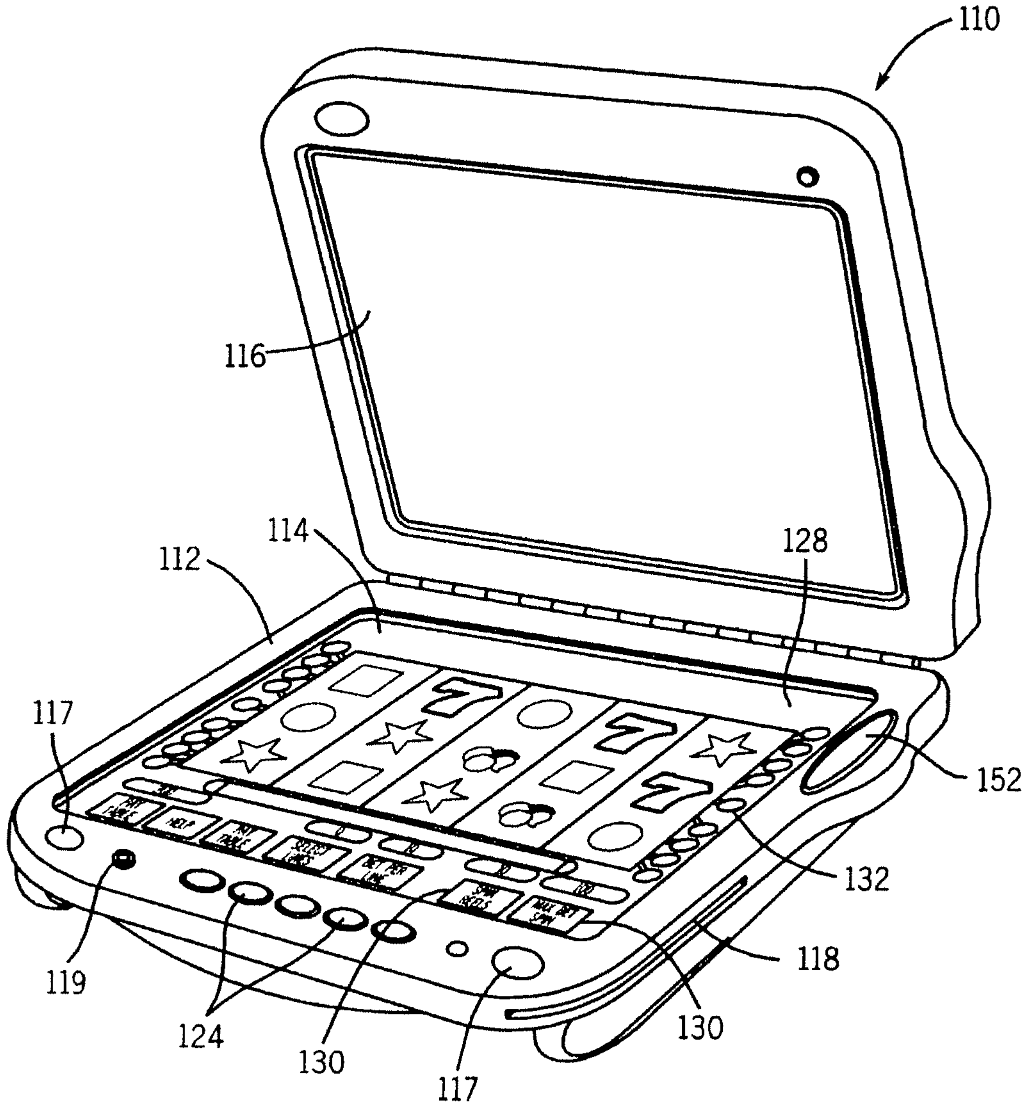
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible.

In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to or in place of the primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The player input device 124 may further or alternatively comprise, but is not limited to, a joystick, cursor control buttons, mouse, slide selection switch, a rotatable wheel, a rotatable wheel and button combination (e.g., like the RIM BlackBerry®), and/or, as described below, a movement sensor 200.

The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
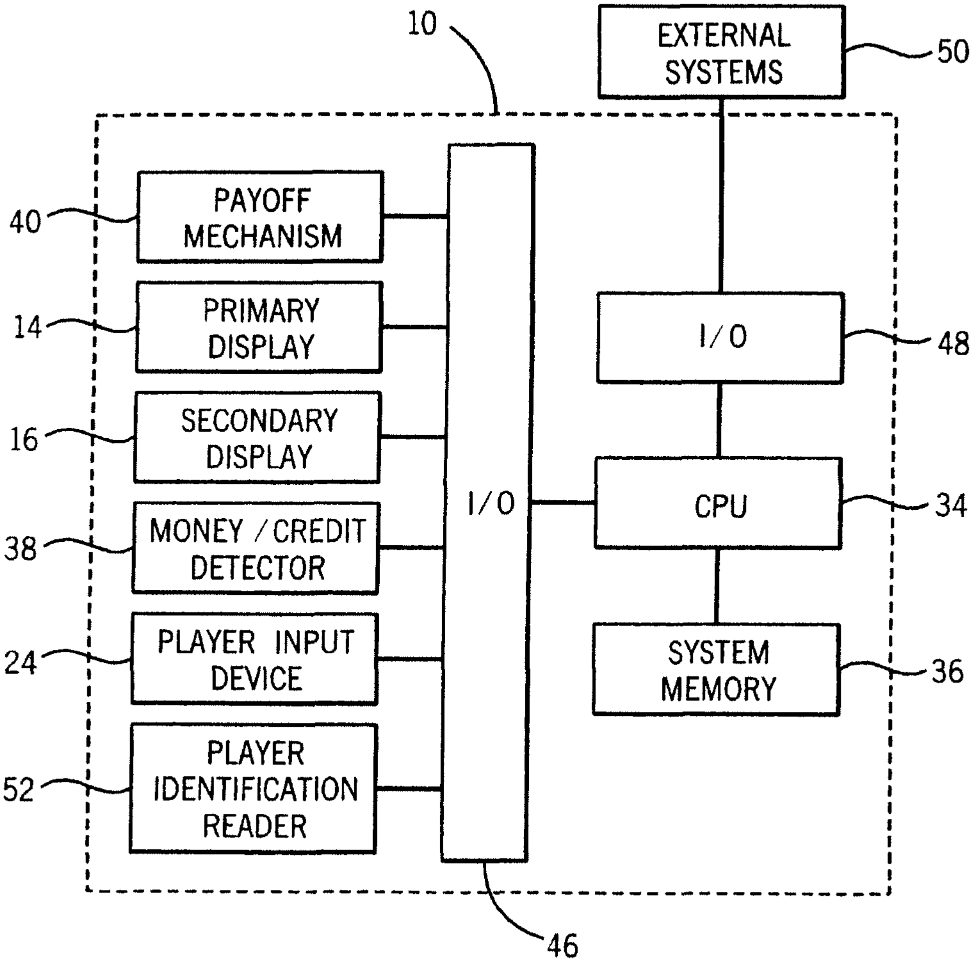
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other handheld gaming machines 110 or fixed (e.g., upright) gaming machines 10, a gaming server, a central game controller, wireless or hardwired communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, IPOD/MP3/digital music player, handheld entertainment device, mobile phone, etc.

Figure 3:
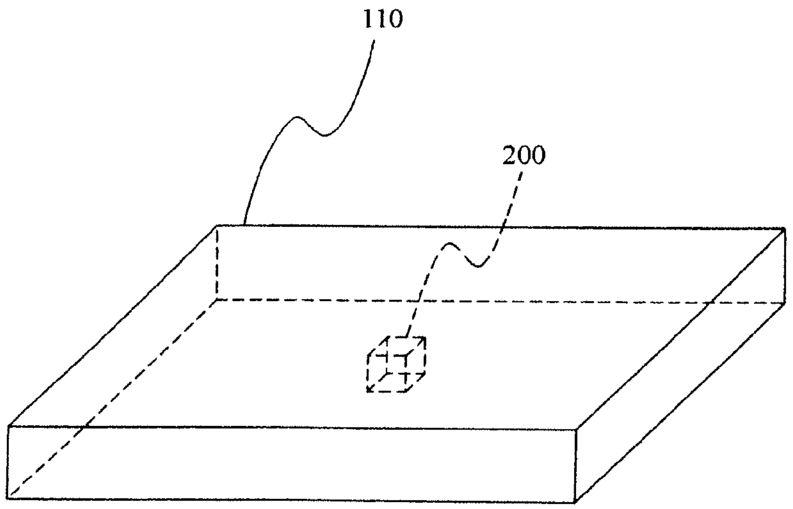
FIG. 3 is a handheld gaming machine comprising a movement sensor in accord with at least some aspects of the present concepts.

Turning now to FIG. 3, there is depicted a handheld gaming machine 110 incorporating a movement sensor 200 to provide, at least in part, novel game play capabilities. U.S. Patent Application No. 60/762,744 filed on Jan. 27, 2006, titled "Handheld Device for Wagering Games," discloses handheld gaming machines 110 which may advantageously be utilized in combination with the present concepts and is incorporated herein by reference in its entirety.

Figure 4A:
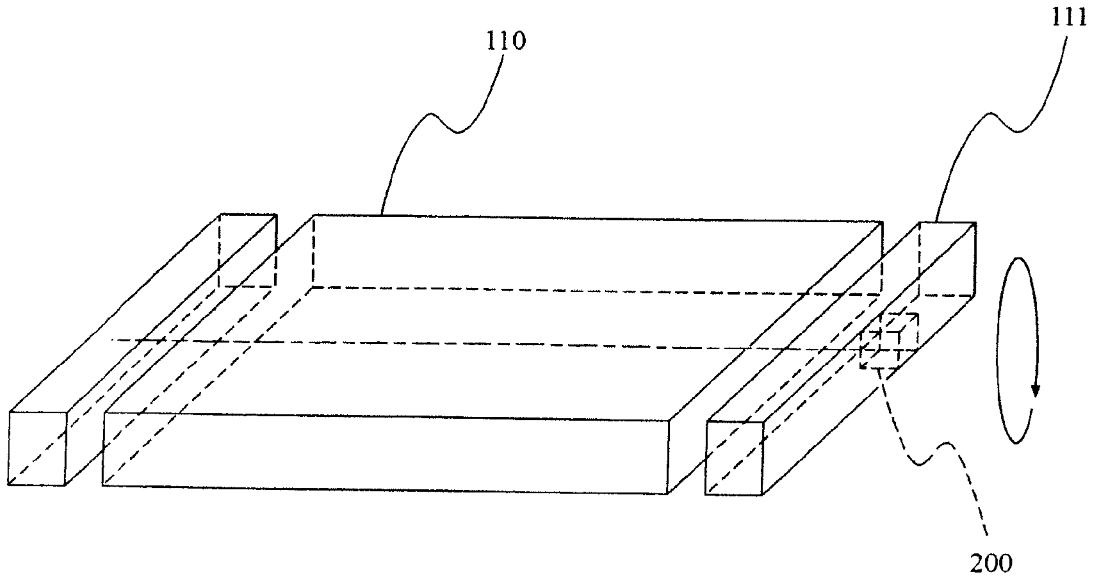
FIGS. 4(*a*)-(*b*) show a handheld gaming machine comprising a movable sub-portion including a movement sensor in accord with at least some aspects of the present concepts.
Figure 4B:
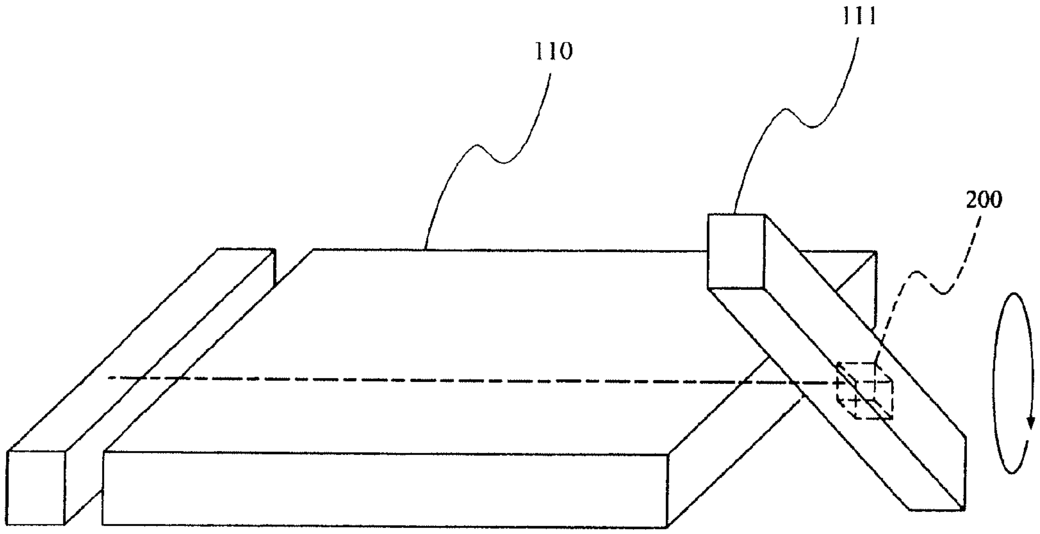

As used herein, the term movement shall be generally construed to apply to any change in position of the handheld gaming machine 110, or a movable sub-portion 111 thereof, such as the movable handle 111 shown in FIGS. 4(*a*)-(*b*), from one position to another position or to any one of a plurality of positions about one or more axes of translation and/or rotation. In FIG. 4(*a*), the handle 111 is shown to be substantially parallel to the handheld gaming machine 110, whereas in FIG. 4(*b*), the handle is rotated in a direction of the arrow to a position disposed at an angle thereto. The term movable sub-portion 111 may include any component of the handheld gaming machine 110 configured to move with respect to at least one axis, but excludes, for example, movement of components such as depressible buttons along an axis of actuation. The movable sub-portion 111 may comprise such buttons or other player-input devices.

Figure 5:
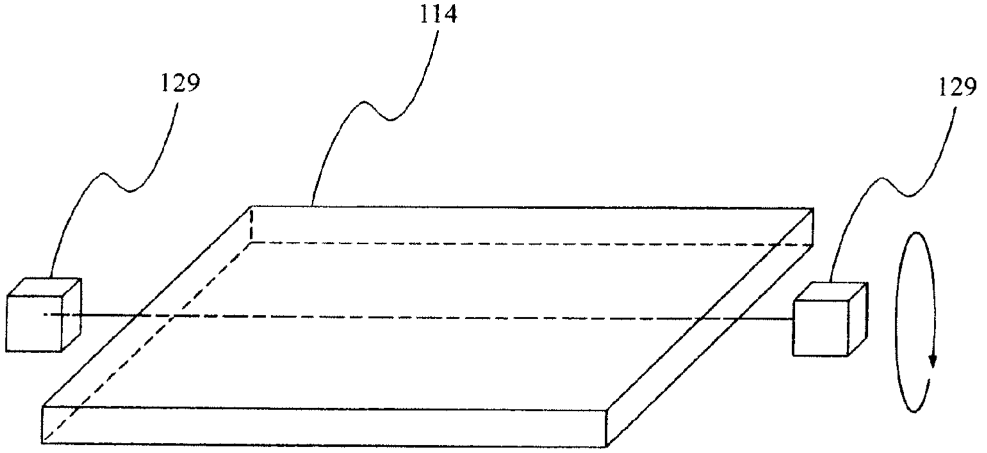
FIG. 5 is a handheld gaming machine comprising a movable display in accord with at least some aspects of the present concepts.

In at least some aspects of the present concepts, such as is shown in FIG. 5, the display 114 of the handheld gaming machine 110 is balanced, via bearings 129 or a bearing supporting frame, so as to be rotatably disposed within the casing 112 to permit the display to rotate with respect to at least one axis of rotation. In such a configuration, the display 114 "floats" within the casing 112 so that the display may tilt or rotate relative to the casing 112. Thus, the display 114 and casing 112 of the handheld gaming machine 110 may move relative to one another with minimal to no collateral movement of the other component. The display 114 may advantageously include a lock to permit securing of the display relative to the casing 112.

In one aspect of the above-noted configuration, the movement sensor(s) 200 is disposed in or on the casing 112 of the handheld gaming machine 110 and movement of the casing during game play will not unduly disturb game play since the position of the display 114 relative to the player remains substantially static. For example, the display 114 moves relative to the player's view to a lesser degree, and preferably a far lesser degree, than the movement of the casing 112. In another aspect, the movement sensor(s) 200 is integrated within or on the display 114 and the movement of the display provides the movement inputs into the game play. The acceleration of the player-controlled object, described below, preferably, but not necessarily, corresponds in degree to a degree of movement of the display 128 so that increasing angles of displacement result in increased acceleration of the object.

Figure 6:
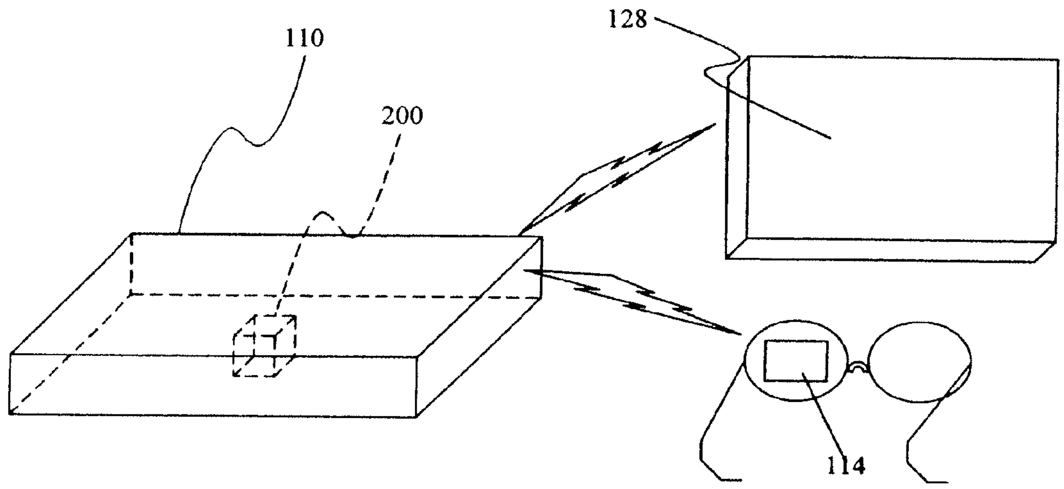
FIG. 6 is a handheld gaming machine comprising a remote display in accord with at least some aspects of the present concepts.

In an alternate display configuration, the handheld gaming machine 110 display 114, or touch screen display 128 is separable from the casing 112 and the display communicates with the handheld gaming machine 110 via a wired or wireless connection, such as is represented in FIG. 6. The display 114 may comprise a wearable display, (e.g., a heads-up display) such as, but not limited to, those made by Cybermind Interactive Nederland of the Netherlands (e.g., Visette 45 SXGA or Hi-Res 800), eMagin of Washington (e.g., Z800 3D visor), Icuiti of New York (e.g., V920), i-O Display Systems of Sacramento, Calif. (e.g., i-Theatre, i-glasses video, i-glasses video 3-D pro, i-glasses PC/SVGA, i-glasses PC/SVGA Pro 3D), or Leadtek of Taiwan (e.g., X-Eye (2D video)), NVIS of Reston, Va. (e.g., nVisor ST, nVisor SX), Olympus of Japan (e.g., head mount display (HMD)). Such wearable display may comprise a 2-panel (i.e., 2-eye) display or a 1-panel (i.e., 2-eye or 1-eye) display. The handheld gaming machine 110 and associated movement sensor 200 is thus configured to move relative to a reference, as noted above, but the (wearable) display 114 does not itself move relative to the player's field of vision. Therefore, the player can enjoy the gaming experience without viewing the display at an unfavorable angle resulting from game inputs (e.g., tilting or rotational movement of the handheld gaming machine).

Figure 7:
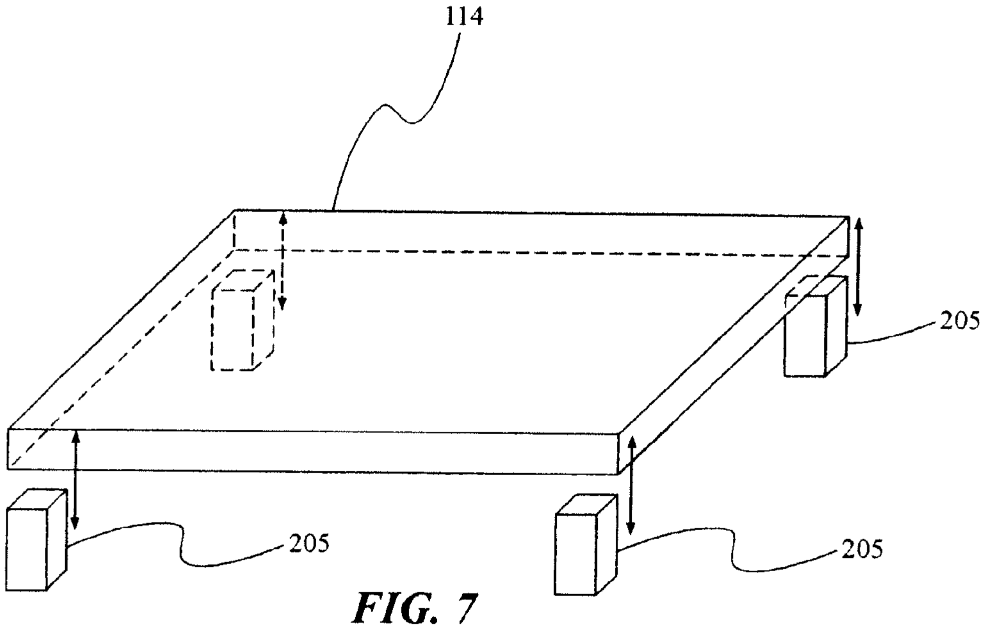
FIG. 7 is a handheld gaming machine comprising actuators in accord with at least some aspects of the present concepts.

In still other aspects, the outputs of the movement sensor(s) 200 are directly or indirectly (e.g., following processing) are utilized as control signals, in combination with fast acting actuators 205 in the handheld gaming machine 110, to automatically adjust the orientation of the display 114 to partly or substantially compensate for movements of the handheld gaming machine by the player. In this manner, such as show in FIG. 7, even if the player rotates the handheld gaming machine 110 by any predetermined range of angles, such as between about 0-15°, the actuators 205 rotate the display 114 so as to still be "right-side up." In other words, the display is rotated to an angle so as to remain substantially within (e.g., substantially perpendicular to) a player's line of sight during game play. For example, this angle may be set by a player according to the player's preference, a player's height, or, alternatively, may comprise a preset angle selected to accommodate most players.

In other aspects, the actuators 205 are configured to rotate the display 114 through greater ranges of angles such as, but not limited to, 0-30°, 0-45°, 0-60°, 0-90° or any other desired range, inclusive of beginning and ending angles within these ranges (e.g., 30°-45°). Alternatively, the actuators 205 could comprise one or more stepper motors configured to interact with a shaft or other mechanical member attached to display 114, such shaft, boss, or member forming an axis of rotation about which the display 114 is configured to rotate. The stepper motors correspondingly engage one or more gears disposed on the shaft or other mechanical member. The stepper motors may be disposed within either or both of the casing 112 or a handle. In one configuration, the mechanical member (e.g., a fastener or anchor) attached to the display 114 may itself comprise a first stepper motor configured to engage a second stepper motor disposed in a handle 111 to act in opposing directions to enhance the speed of the angular rotation of the display.

Figure 8:
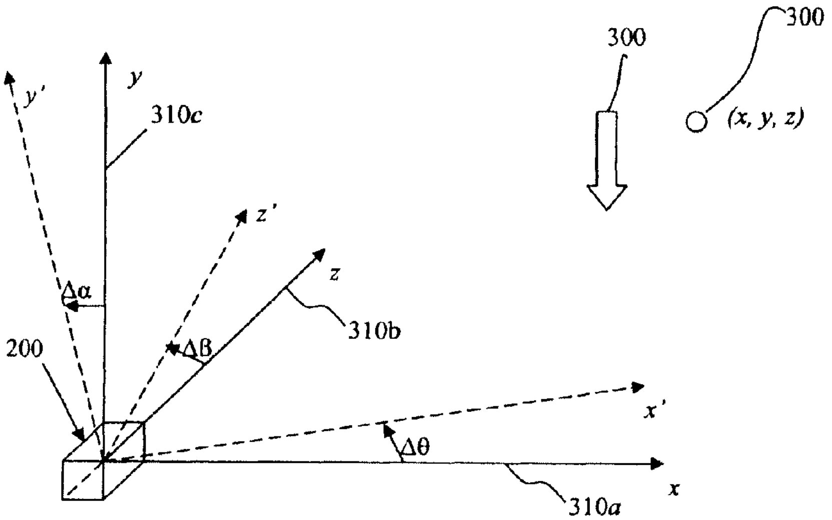
FIG. 8 depicts an example of a reference coordinate system for a movement sensor of a handheld gaming machine in accord with at least some aspects of the present concepts.

As represented by the example of FIG. 8, the movement sensor 200 comprises, in at least some aspects, one or more sensors configured to determine the movement (e.g., rotation, translation, etc.) of the handheld gaming machine 110, with respect to an established datum or reference 300, about or along one or more axes 310*a-c*. The reference 300 may generally comprise any position, spatial orientation, reaction, force, velocity, acceleration, electrical contact, or characteristic from which another position, reaction, force, velocity, acceleration, electrical contact, or characteristic may be compared. In one example, represented as the downwardly-pointing arrow in FIG. 8, gravity is one possible reference 300. A variety of movement sensors 200 are well known and include, but are not limited to, tilt sensors (e.g., pendulums, electrolytic devices, liquid filled tubes) and accelerometers, any of which may be used singly or in combination with the handheld gaming machine 110.

The noted datum or reference 300 may also comprise a known position in a predefined reference system at a known point in time, the predefined reference system including any reference system including, but not limited to an orthogonal Cartesian coordinate system or spherical coordinate system. Once the reference is established, the movement sensor 200 or controller 34 can respectively measure and process relative translational movements therein such as, but not limited to, for example, $\Delta x$ (e.g., $x_2$-$x_1$), $\Delta y$ (e.g., $y_2$-$y_1$), $\Delta z$ (e.g., $z_2$-$z_1$), and relative angular movements therein such as, but not limited to, for example, $\Delta\theta$ relative to an x-axis, $\Delta\alpha$ relative to a y-axis, and $\Delta\beta$ relative to a z-axis, and the like, such as is represented in FIG. 8.

External systems 50 (FIG. 2) may be configured to provide one or more known references 300 such as, but not limited to, output of carrier signals bearing information to the movement sensor 200 from the external systems, via a communication device, or receipt of carrier signals bearing information by the external systems from the movement sensor via the communication device. Such carrier signals bear information such as, but not limited to, a location of the handheld gaming machine 110 relative to one or more discrete external systems 50 (e.g., receiver, transceiver, transceiver, etc.) or bear information derivable by the carrier signal (e.g., a signal strength). One example of an indoor location system using RF signal strength in IEEE 802.11 networks utilizes radio signal strength information collected from multiple base stations at different physical locations to determine location (see, e.g., Adam Harder, Lanlan Song, Yu Wang, "Towards an Indoor Location System Using RF Signal Strength in IEEE 802.11 Networks," pp. 228-233, International Conference on Information Technology Coding and Computing (ITCC'05), incorporated herein by reference in its entirety).

In one presently preferred embodiment, the handheld gaming machine 110 comprises three micro-accelerometers arranged orthogonally to one another to enable continuous measurement of acceleration in three dimensions and output of signals relating to such acceleration to a handheld gaming machine 110 controller (e.g., 34) or communication device. Movement sensors 200 which may be used in accord with the present concepts include, for example, the SQ-SEN-001P/1PS or SQ-SEN-003P/3PS/3PS-XL tilt and vibration sensors manufactured by SignalQuest of New Hampshire. In a presently preferred embodiment, the movement sensor 200 comprises a micro-machined and/or micro-electro-mechanical system (MEMS) such as model SQ-SI2X-360 series (e.g., 360° single-axis, 180° dual-axis, or 360°×180° dual-axis), also manufactured by SignalQuest. The SQ-SI2X-360DA is a solid-state MEMS inclinometer configured to provide analog and digital output signals corresponding to a full scale range of 360° of pitch angle and 180° of roll angle.

In still other embodiments, the movement sensor 200 comprises a gyro-enhanced orientation sensor, such as the 3DM-GX1 or the Inertia-Link wireless inertial sensor suite manufactured by Microstrain of Burlington, Vt., the MMQ50, MMQ-G GPS/INS sensors manufactured by BEI Systron-Donner of Concord, Calif., or the InertiaCube$^2$ (e.g., with optional Genlock feature for improved graphic synchronization) manufactured by Intersense, Inc. of Burlington, Mass. Still additional movement sensors 200 utilizable in combination with the handheld gaming machine 110 are those manufactured by Watson Industries of Eau Claire, Wis. The Watson Industries movement sensors 200 employ solid-state vibrating structure gyroscopes providing an output voltage proportional to the rate of turn applied to a sensitive axis to measure angular motion. The Watson Industries movement sensors 200 utilize, as a reference, coriolis forces generated when a moving particle is rotated. Still another movement sensor includes the Intelli-G family of gyro sensors manufactured by Invensense Inc. of Santa Clara, Calif., such as the InvenSense IDG-1000 integrated dual-axis MEMS (Micro-Electro-Mechanical Systems) gyroscope. These examples are illustrative of some types of movement sensors 200 utilizable in accord with the present concepts as an input for a handheld gaming device 110.

The movement sensor 200 advantageously comprises a wireless communication device such as, but not limited to, an RF transmitter and receiver or transceiver, configured to support one or more communication options, paths, and/or protocols or standards (e.g., 802.15.4, USB, RS-232 serial, and/or CAN bus, etc.). Alternatively, the movement sensor 200 outputs a signal to a handheld gaming machine 110 controller (e.g., 34) or communication device 210 such as, but not limited to a wireless communication device configured to support one or more communication options, paths, and/or protocols or standards.

In at least some aspects, the handheld gaming machine 110 movement sensor 200 is configured to detect, and preferably measure, movement and/or rotation in three dimensions (i.e., about each of the x-axis, y-axis, and z-axis in an orthogonal Cartesian coordinate system or, for example in another coordinate system such as a skew coordinate system). However, in other embodiments, the handheld gaming machine 110 movement sensor 200 is configured to detect, and preferably measure, movement and/or rotation along and/or about only a single axis or about two axes. Movement, as used herein, includes not only translational movement, but also derivatives thereof with respect to time including velocity and acceleration. As noted above, in some embodiments, the movement sensor 200 comprises sensors such as gyroscopes to distinguish between rotation and linear acceleration.

In accord with the disclosed handheld gaming machine 110 bearing one or more movement sensors 200, numerous gaming scenarios particular to the disclosed configuration are possible, non-limiting examples of which are provided below.

In at least some embodiments, for example, the output(s) of the movement sensor(s) 200 are provided as game inputs. The movement sensor(s) 200, employed in combination with software (i.e., instructions to one or more processors), thus facilitate games in which the motion of the handheld gaming machine 10 or movable sub-portion(s) thereof is used as a player input. Optionally, the movement sensor(s) 200 output and/or processing of signals or data relating thereto may be adjusted by the player and/or by the gaming establishment to increase or decrease a sensitivity of a handheld gaming machine 110 to movement, much as in the same manner that a sensitivity of a computer mouse may be alter to suit a user's preferences.

Figure 9A:
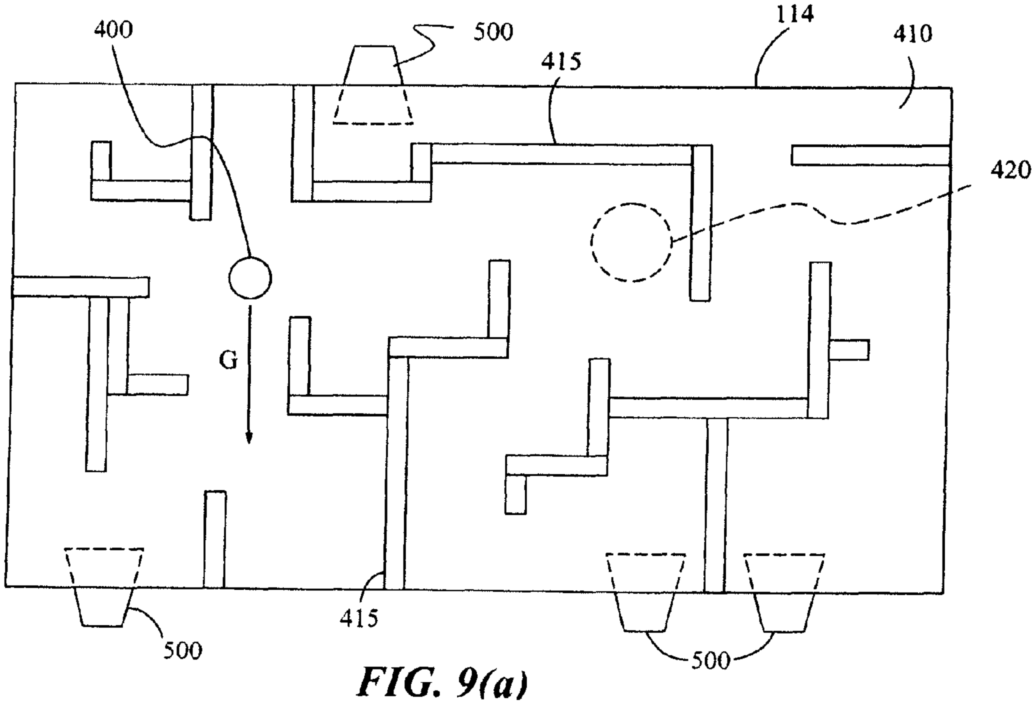
FIGS. 9(*a*)-(*b*) depict examples of types of gaming environments suited for use in combination with a handheld gaming machine in accord with at least some aspects of the present concepts.
Figure 9B:
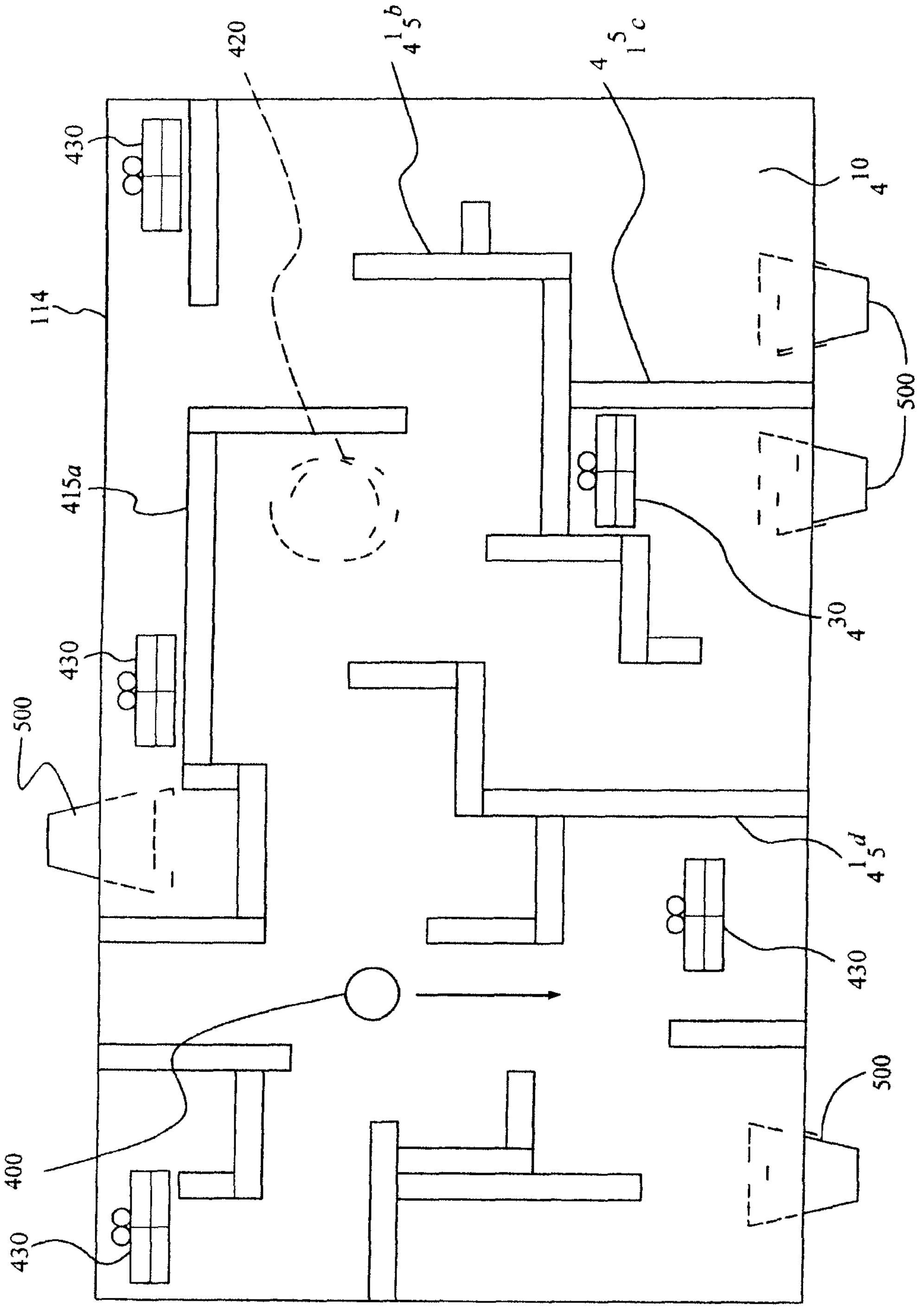

In one example, such as is represented in FIG. 9(*a*), the output of the movement sensor(s) 200 is used to simulate gravitational forces "G" on simulated elements 400 within the game environment 410, which is shown by way of example as a maze. The simulated gravitational forces G may be modeled accurately (e.g., relative to a common reference mass, such as the earth), or may alternatively be increased, decreased, non-liner, curved, warped or reversed from that of the accurate model. The simulated gravitational forces G may further be supplemented by representations of other forces such as, but not limited to, friction, air resistance, external forces, and/or reactive forces. External forces may include, by way of example, reactive forces from walls 415 (e.g., of a maze or other environment) or other objects or obstacles 420 (e.g., a hill, a valley or depression? a water hazard, turntable, etc.) within the game that may impart forces on the object 400 (e.g., a ball, a car, a character, etc.) controlled by the player.

In accord with these aspects, the player reveals the contents of, or outcome associated with, presents by causing the player-controllable object 400 (e.g., ball) to collide with the desired player-selectable element(s) (e.g., a wrapped present). As noted above, the player guides the ball by tilting the handheld gaming machine 110 or sub-portion 111 thereof. As one example, shown in FIG. 9(*b*), an object 400, such as a ball, within a game environment 410 comprising a maze, a first wall 415*a* is a sticky wall which slows the ball, a second wall 415*b* causes the ball to speed up, a third wall 415*c* causes the ball to split into two or more separate balls, and a fourth wall 415*d* causes the ball to achieve double points for a predetermined time. Still additional walls might, for example, enable the ball to pass through a predetermined number of walls, impart a rotation to the ball to cause a wobble, or alter the game-physics for a predetermined time (e.g., doubling gravity, reducing gravity, etc.). The same or different types of effects may similarly be attributed to other non-player controlled objects or obstacles 420 within the game. In at least some embodiments, the particular characteristics imparted by various the walls 415 or objects 420, such as the walls provided by way of example above, are denoted by different colors, textures, and/or shapes, so as to enable differentiation therebetween by a player.

Accordingly, one game employing the movement sensor(s) 200 may simulate a player-controlled object 400 such as, but not limited to a ball, within a maze or other gaming environment 410. In such example, to move the ball 400, the player moves the handheld gaming machine 110, or movable sub-portion 111 thereof, to cause the ball to move in desired directions within the maze or environment 410. For example, in one possible configuration, a player may tilt the handheld gaming machine 110 so that the far or distal end of the handheld gaming machine is lower than the close or proximal end of the handheld gaming machine to make the ball move forward (e.g., along a path in a maze) and the player may tilt the handheld gaming machine so that the right end of the handheld gaming machine is lower than the left end of the handheld gaming machine to make the ball move to the right (e.g., along a path in a maze). In at least some embodiments, the handheld gaming machine 110 is configurable by the player to reverse or alter the default inputs to suit the player's preferences.

The player-controlled object 400 subjected to the gravitational forces G need not be limited to a ball and may alternatively comprise any player-controllable object (e.g., a Pac-Man-type figure gobbling up dollar signs along selected paths, a car traveling along selected roads and/or going over jumps, a bipedal figure, etc.). In at least some embodiments, the various paths or directions that may be selected by a player comprise objects or obstacles 420, as noted above, to slow or to prevent movement. Player-selectable elements 430 are optionally provided to enable providing beneficial random outcomes (e.g., bonus points, extra turn, etc.) and/or detrimental random outcomes (e.g., end-of-turn, end-of-bonus, loss of points, etc.). A player's excitement is advantageously heightened by provided various combinations of obstacles 420 and player-selectable elements representing potential benefits and/or pitfalls. In one example, the player-selectable elements 430 comprise representations of wrapped presents. The player-selectable element 430 (e.g., presents) may be selected by the player by maneuvering the simulated ball 400 to roll over a selected one of the player-selectable elements, at which time the outcome associated with the selected player-selectable element is revealed to the player.

Figure 10:
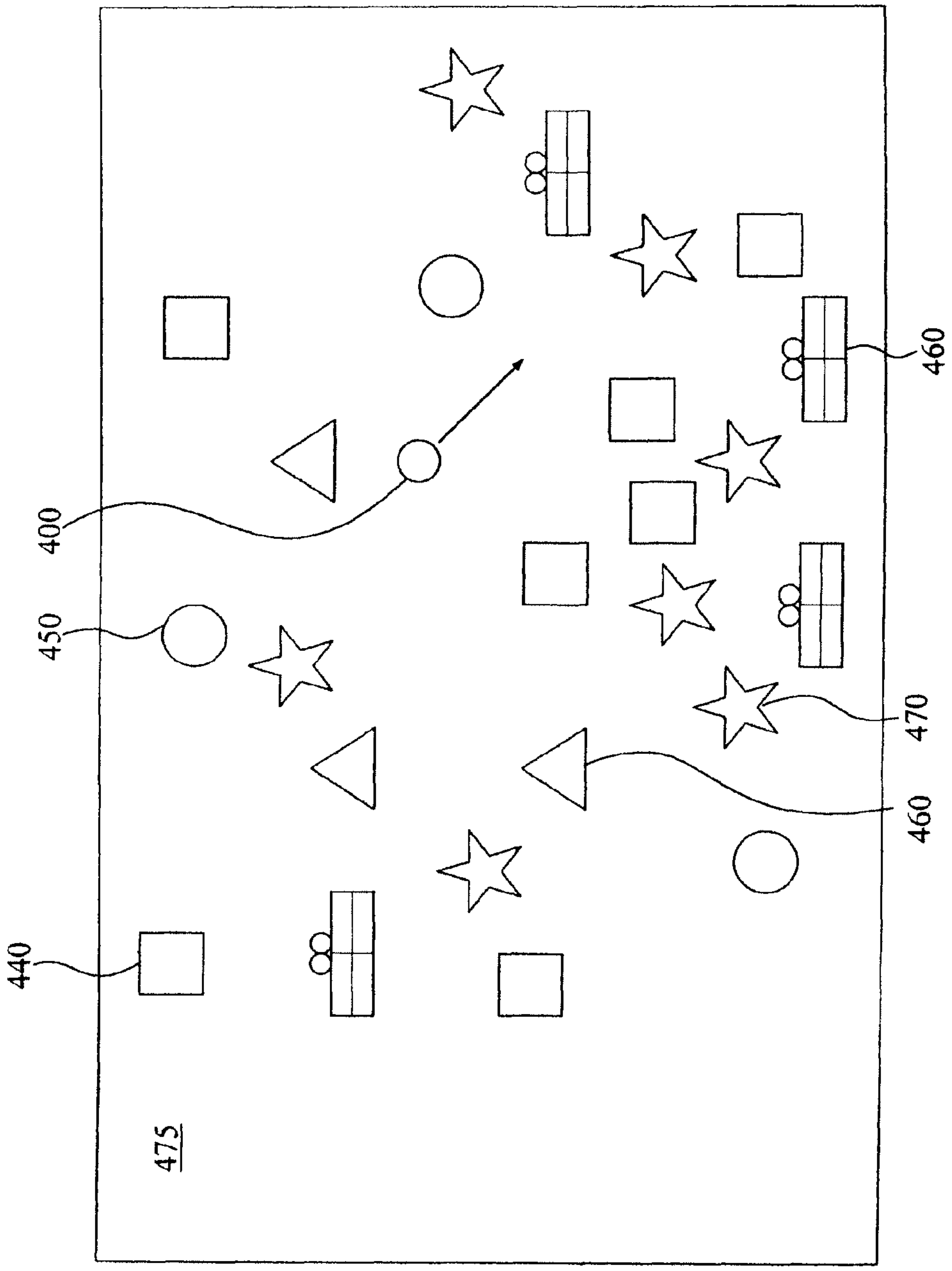
FIG. 10 is another example of a type of gaming environment suited for use in combination with a handheld gaming machine in accord with at least some aspects of the present concepts.

Accordingly, as shown in FIG. 10, the gaming environment 410 in which the player-controllable object 400 is maneuvered may, in at least some aspects, comprise a conventional "picking" game, wherein the direction that the player moves the player-controllable object comprises the player's "selection." An actual player-selectable element 430 may be disposed in each of the directions in which the player-controllable object is permitted to travel, but player-selectable elements are not a necessary part of the present concepts. In other words, a player's selection may be reflected simply by the moving of a player-controllable object or ball in one of a plurality of predetermined directions, rather than the ball's or object's touching a present or other player-selectable element and game play will proceed in accord with such selection.

Although the example above is presented in relation to a 2-D environment, still additional aspects wherein the output (s) of one or more movement sensor(s) are provided as game inputs to control a simulated element within a 3-D game environment. For example, the simulated element may comprise a fighter jet flying through a 3-D game environment, such as that provided in the TOP GUN™ game developed by WMS Gaming Inc. of Waukegan, Ill. In such an embodiment, the handheld gaming machine 110 could be configured so that a tilting of the handheld gaming machine to the left (e.g., right side of handheld gaming machine raised relative to the left side) would cause the F-14 "Tomcat" fighter jet to bank left whereas a tilting of the handheld gaming machine to the right (e.g., left side of handheld gaming machine raised relative to the right side) would cause the jet to bank left. Similarly, a tilting back of the handheld gaming machine 110 (e.g., a distal side of the handheld gaming machine is raised relative to the proximal side) would cause the jet to pitch up and conversely, a tilting back of the handheld gaming machine (e.g., a distal side of the handheld gaming machine is lowered relative to the proximal side) would cause the jet to pitch up. The same general concepts apply to any type of 3-D gaming environment including, but not limited to control of a vehicle, water craft, aircraft or simulated person or animal within a selected gaming environment.

Whereas a convention maze often comprises a single path from the starting point to the ending point, goal or exit (hereinafter collectively "goal"), depending on the particular game configuration, the present concepts advantageously provide a plurality of possible paths between a starting point and at least one goal 500 to facilitate the "selection" mechanism desired for a game of chance. In at least some aspects, such as is represented in FIGS. 9(*a*)-(*b*), at least one player-selectable element 430 is disposed along at least one path and, as shown, may be disposed along a plurality of paths. Thus, by traversing a particular path, the player is making a selection from amongst a plurality of potential paths. The plurality of potential paths are represented by the possible routes a player-controlled object 400 may traverse to arrive at one of the plurality of goals 500. An award is optionally associated with one or more of the goals 500. As yet another alternative, one or more of the possible paths between a starting point and at least one goal 500 comprises a plurality of selectable sub-paths or detours selectable by a player.

In at least some aspects of the gaming environment 410 comprising a maze, noted above, the player-controlled object (e.g., a simulated ball 400) is located within the maze and a player's tilting of the handheld gaming machine 110 or sub-portion 111 thereof accelerates the simulated ball in relation to the degree of tilt and the game-physics (i.e., normal or off-normal) to achieve an objective of the game, as noted above. For example, the objective could be to move the ball 400 from a first point in a gaming environment 410, such as a starting point in a maze, to a second point in the maze, such as a goal 500. The gaming environment 410 comprises one or more levels. In at least some aspects, the game physics may change from area to area or from level to level, either predictably (e.g., incrementally increasing or decreasing gravity) or randomly. In one embodiment, for example, the force accelerating the player-controlled object 400, such as a ball, may be relatively low (e.g., below normal gravity) on a first level to reduce the potential velocity of the ball to make the level easier to accomplish and the force accelerating the ball then increases with each successive level so that the levels become more difficult as the player progresses from level to level.

In at least some other aspects, the game physics may change responsive to an interaction of the player-controlled object 400 with an element in the game space such as, but not limited to movement of the player-controlled object over a player-selectable element 430 or into contact with an object 420 having a predefined association with a predetermined game physics outcome.

For example, as shown in the example of FIG. 10, certain objects 440 within the gaming environment 410 (e.g., squares) are associated with a decrease in gravity, other objects 450 within the gaming environment (e.g., circles) are associated with an increase in friction, and still other objects 460 within the gaming environment (e.g., triangles) are associated with an increase in gravity. Similarly, the player-selectable elements 430 may be randomly associated with any one of a plurality of predetermined outcomes, which may include game-physics altering outcomes. Thus, in at least some types of games, a player may attempt to advantageously maneuver the player-controlled object 400 over or into certain objects 440, 450 so as to slow movement of the player-selectable element to, for example, enable greater control over the movement of the player-selectable element, which may have attendant advantages in the game.

An object in the illustrated example in FIG. 10 may be, for example, to collect as many of the awards associated with the player-selectable elements 430 as possible within a certain time limit and/or without triggering a game-ending outcome, such as by encountering an object 470 having a predefined association with a game-ending or game-limiting outcome (e.g., a star ends the game). Particularly desirable awards or player-selectable elements 430 associated with increased levels or probabilities of awards are optionally disposed in a portion or portions of the gaming environment 410 that is/are difficult to reach without encountering the object(s) 470 having a predefined association with a game-ending or game-limiting outcome, such as is shown in the example of FIG. 10. To increase a player's chances of successfully navigating through a group of stars 470 to reach certain player-selectable elements, a player may need to, for example, slow the player-controlled object 400 in the manner noted above.

In accord with the above examples, it is to be understood that the present invention provides a method of and an apparatus for game play wherein player skill contributes to the enjoyment of the game, but where the outcome remains at least substantially a game of chance. To this end, a wagering game equalizer is advantageously, but optionally, incorporated into the handheld gaming system. For example, a player might be sufficiently skilled in handling the handheld gaming machine 110 to deviate from a measure of the expected value (EV) associated with the game. The measure of the expected value (EV) may comprise any algorithm or estimations of the player's performance. Such algorithm or estimations may consider, for example, the player's performance over a selected period of time (e.g., seconds, minutes, hours), and/or the player's performance as compared to an average, median, or 1σ, 2σ, or 3σ range of other player's performance.

To compensate for skill-based factors and maintain a predetermined expected value associated with the game, an equalizing triggering event (e.g., achieving an award in excess of a predetermined limit) is used to cause an equalizing event to cause the expected EV to be obtained. For example, on a screen with seven player-selectable elements 430 (e.g., wrapped presents), the player may successfully obtain five of the player-selectable elements, which might have a probability associated therewith of 1%. This success could comprise the equalizing triggering event and, as the player attempts to obtain a sixth player-selectable element 430, an equalizing event with a probability of 100% is initiated to end the game. The equalizing random event preferably comprises graphics and video elements consistent with a general theme of the game. For example, where the player-controlled object 400 is a ball and the gaming environment 410 is a maze, a hole could unexpectedly open up just under the player's ball as the player is about to obtain another award.

The aforementioned gaming environment(s) 410 may be fixed, selected from a plurality of predefined gaming environments, or may be randomly generated for each bonus round. Random generation of such gaming environments, such as mazes, within constraints intrinsic to the nature of the wagering game provides players with continued excitement and avoids staleness which might otherwise occur when a player sees the same gaming environments time and time again. Additionally, to facilitate excitement and enhance the game play experience, the gaming environment(s) 410 is optionally modeled in three-dimensions, rather than two-dimensions. Further, the gaming environment 410, whether in 2-D or 3-D, is optionally depicted in a transparent, translucent or isometric perspective so that the player can see, in whole or in part, one or more levels that are above or below a current level.

Figure 11:
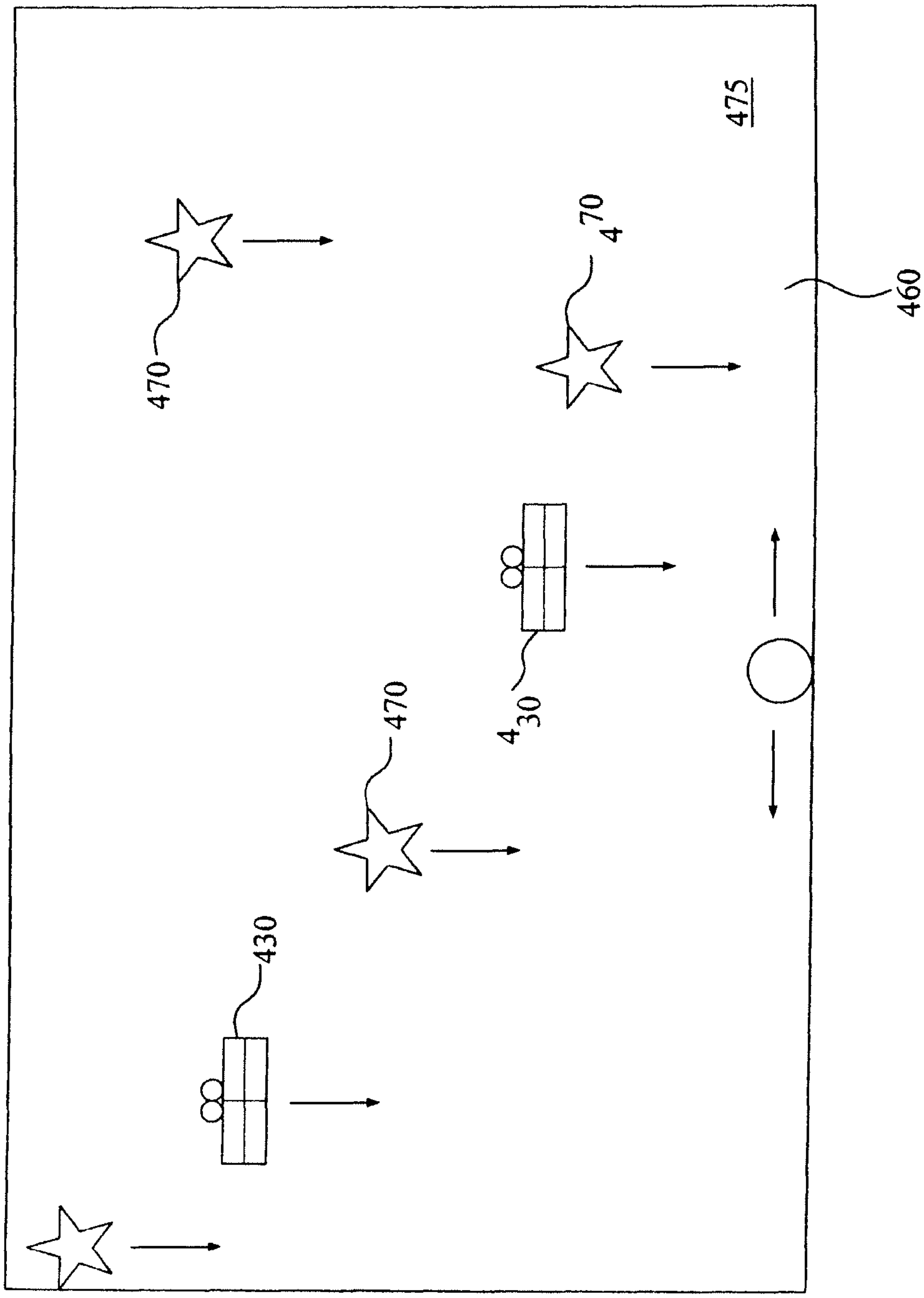
FIG. 11 is yet another example of a type of gaming environment suited for use in combination with a handheld gaming machine in accord with at least some aspects of the present concepts.

As shown in FIG. 11, an example of an aspect of the present concepts is shown wherein there is no gaming environment 410 in which the player must navigate the player-controllable object 400. Instead, as illustrated in FIG. 11, the player-controlled object 400 is disposed against a backdrop 475 and one or more player-selectable elements 430 (e.g., presents) are disposed to float or travel across the screen. For example, one or more presents 430 and/or objects 470 associated with bonus-ending outcomes or game-ending outcomes may be "dropped" from the top of the screen and the player must move the player-controllable object 400 laterally to intercept the present as it falls toward the bottom of the screen in the direction of the arrows. To increase a difficulty of the game, the objects may move downwardly at an angle with respect to the bottom of the screen or may move laterally in a random, predefined, or cyclic pattern.

Additionally, the gaming environment 410 optionally comprises fixed obstacles. As with conventional video games, a plurality of levels of increasing difficulty, and increasing award potential, may be offered, typically with different backgrounds. For example, the player-selectable elements 430 travel horizontally across the screen and the player required to move the player-controlled object 400 upwardly on the screen to intercept and thereby select the player-selectable elements. Optionally, the objects 470 associated with bonus-ending outcomes or game-ending outcomes travel horizontally across the screen on the bottom of the screen, such as shown in FIG. 11, and the player would be required to move the player-controlled object 400 upwardly on the screen to avoid the adverse outcome. Naturally, if the motion of the player-controllable object is constrained to travel along a single axis, such as left and right along a horizontal axis along the bottom of the display 128, a single tilt sensor may be provided to facilitate the movement in response to the player's movement of the handheld gaming machine 110 or sub-portion 111 thereof.

The present concepts may also advantageously be employed in combination with community games or shared-experience games, such as competitive, cooperative, or tournament play, in which multiple players play together or against one another for awards. In at least some embodiments, for example, a skill-based tournament could require a plurality of players to traverse a gaming environment 410 such as, but not limited to a maze, as fast as they can with the highest award going to the player able to traverse the gaming environment the fastest. In other embodiments, for example, a game may include a plurality of players simultaneously competing in the same gaming environment 410 on their individual handheld gaming machines 110. In one aspect of such embodiment, the game starts simultaneously for all players and the game ends when a predetermined result is achieved by one or more players. For example, the predetermined result may include, in one aspect, completion of a maze by a single player. In other examples, the predetermined result includes the completion of a maze by a predetermined number of players (e.g., three players achieving first, second, and third place, respectively). In yet another example, the predetermined result comprises all of the players, a fraction of the original number of players, or a randomly determined number of players. In one aspect of a tournament play, using the example of a maze, a percentage of the players (e.g., half of the players) are eliminated at each round or level of the tournament.

In a variation of the above concepts, players are permitted to enter the tournament play at any time during the course of a tournament period. The player's time to completion, or other performance-based measure, is then displayed on signage or an area display along with the times or other measure of the other players, which may be presented in a hierarchical arrangement. A separate "leader board" is optionally provided. In lieu of times to completion, the other performance-based measure(s) may include, but is (are) not limited to, an accumulated value of the player-selectable elements (e.g., presents) accumulated by the player. Thus, other performance-based measure(s) may be selected so that the player's performance in the game is substantially independent of a player's skill as a factor.

In at least some other aspects, the game itself may be configured to completely eliminate skill as a variable. For example, a player may be presented with two, three, or four player-selectable objects 430 and the player is required to merely tilt the handheld gaming machine 110 or sub-portion 11 thereof in the direction of the desired player-selectable object (e.g., left, right, forward, backward) and the player-controllable object 400 will automatically track toward the indicated player-selectable object.

In accord with the above-noted shared-experience games, such as the tournament games, awards may be distributed on each level or at each stage so that all players have an opportunity to receive awards. Alternatively, winner-take-all tournaments are also possible.

The above-disclosed concepts also are equally applicable to cooperative games involving two or more players in one or more locations. In one example of a cooperative game, a floating award game is provided, as described in relation to FIG. 11 above, wherein a player's player-controlled object 400 is disposed against a backdrop 475 and one or more player-selectable elements 430 (e.g., presents) are disposed to float or travel across the screen in a predetermined or random linear or non-linear path. In such a cooperative game, the player is required, at some point or upon the happening of some event, to pass the player-controlled object 400 to another player. This passing of the player-controlled object 400 is achieved, for example, by tilting the handheld gaming machine 110 to cause the player-controlled object, such as a ball, to roll off the top or side of one player's handheld gaming machine 110 display 128.

The direction that the player-controlled object 400 moves is optionally used in combination with the location and orientation of other nearby handheld gaming machines 110 to determine to which handheld gaming machine the player-controlled object is passed. The player-controlled object 400 then appears on the selected handheld gaming machine 110 screen. Based on the relative orientations of the passing and the receiving handheld gaming machines 110, a player-controlled object 400 moving off the side of the passing handheld gaming machine may be introduced at the top of the screen of the receiving handheld gaming machine. The present concepts therefore provide a mechanism allowing players to cooperatively or competitively pass, or pass back-and-forth, a player-controlled object 400 between handheld gaming machines 110. This game mechanism may be extended to facilitate numerous different types of game-related interactions between handheld gaming machines 110. The passing of the player-controlled object 400 is accomplished using the aforementioned wireless (e.g., Bluetooth, IR, etc.) or tethered communication paths and handheld gaming machine 110 location-based information and orientation-based information (e.g., tilt sensor, compass, etc.). Based on the type of data transmission, a player may pass the ball to someone across a room or even in another related or unrelated gaming establishment.

In at least some aspects of embodiments of the present concepts, the wagering game is configured to permit a player to select a level of difficulty so as to control the rate of play and/or the potential levels of the awards. Such option available to a player may further be configured to permit a player to select a level of difficulty based on at least one factor including, but not limited to a player's status within a gaming establishment rewards program, a level of a wager, and/or an amount of a wager.

The aforementioned concepts are applicable to a variety of gaming environments and are not limited to the examples discussed above. For example, the movement of the handheld gaming machine 110 may itself be used as an input for games including, but not limited to, poker and variants thereof, keno, blackjack, or other conventional wagering games and slots-based games. The movement of the handheld gaming machine 110 could, for example, be used as a nudge feature in a traditional slots-based game to cause a slight movement of one or more reels. In a poker game, one defined movement can be configured to represent a hit, whereas a second defined movement can be configured to represent a discard. In still other aspects, a predetermined movement (e.g., a shaking of the handheld gaming machine 110) may trigger a new spin or a new game. In short, the movement of the handheld gaming machine 110 may itself be used as an input for any game, such as a button input. For example, two or more (e.g., 8, 16, etc.) specified movements of the handheld gaming machine 110 may be assigned a specific function or input value. Such movements could include tilting or rotating, shaking, translation, or combinations thereof (e.g., a tilting about a first axis followed by a vertical shake, a tilted whirling about an axis, a lateral back and forth movement, etc.).

Although the movement of the movement of the handheld gaming machine 110 may itself be used as a game input, such as noted above, such movements of the handheld gaming machine may also be used for other types of control inputs. Control inputs may include, for example, on-screen navigation controls (e.g., "previous" or "next" functions, selection of menu items, movement of a cursor, etc.). For example, a button push may activate a pull down menu or a menu bar with a plurality of selectable items. The user of the handheld gaming machine 110 then is permitted to roll the handheld gaming machine toward the user to have the selection bar or highlighting scroll downwardly and to roll the handheld gaming machine away from the user to have the selection bar scroll upwardly. Likewise, a left or right movement of the handheld gaming machine 110 will cause the selection bar or highlighting to correspondingly move to the left or right along the menu bar. Control inputs may also include other types of signals such as, but not limited to, handheld gaming machine 110 safety signals, such as a "park" signal to a hard drive upon a sensing of a predetermined minimum acceleration or unusual movements (e.g., end over end rotation within a specified time period, rotation of more than 360° along an axis within a specified time period, wanton unprovoked shaking of the handheld gaming machine, etc.) by one or more movement sensor(s) 200. Responsive to such a control signal, the head of the hard drive would immediately park in a safe position to avoid the potential of the head damaging the hard disk platter. In such instance, the controller may be configured to display on the display an informational prompt to a user or player informing them of the safety related action taken by the handheld gaming machine 110 and, optionally, a time remaining (e.g., a countdown timer) until normal operation of the handheld gaming machine is resumed.

To ensure that the player's movements of the handheld gaming machine 110 are fully intended to comprise the player's game input or other control input, rather than some inadvertent motion not intended to be a game input or other control input, the player may optionally be required to depress or touch an input validation button or surface (e.g., a conductive surface) to enable the use of a particular handheld gaming machine 110 movement as an input. Thus, when the handheld gaming machine 10 is grasped in a playing position, the player's hand, fingers, or designated finger contacts a conductive surface which senses (e.g., via an impedance, heat, etc.) whether the player is maintaining contact with such conductive surface. Players not wishing to use a movement of the handheld gaming machine 110 as an input could, for example, simply lift a finger away from the contact surface or, alternatively, place their finger in contact with such contact surface.

The handheld gaming machine 110 may optionally be configured to require the player to return the handheld gaming machine 110 to a neutral position following each input movement to register the input. For example, after the player tilts the handheld gaming machine 10 to the right to input the function associated with that movement, the player must return the handheld gaming machine to a substantially horizontal position to then actual register the movement. From such position, the handheld gaming machine 10 in positioned for a subsequent input.

To facilitate viewing, in any mode of operation, whether a game mode or a non-game mode, the handheld gaming machine 110 is optionally configured to automatically change the display from a landscape mode to a portrait mode, or vice versa, as the handheld gaming machine is rotated. The modification of the display in this manner may be prompted by the rotation itself, or may be controlled by non-movement based control inputs, such as the placement of the user's or player's hands on the device. For example, a first set of handgrips or contacts may be provided along a first set of opposing sides of the handheld gaming machine 110 and a second set of handgrips or contacts may be provided along a second set of opposing sides of the handheld gaming machine. Each of the sets of handgrips or contacts would be associated with a particular display orientation. Moreover, such features may advantageously be configurable by a user, such as through a display input.

In at least some aspects, one or both of the primary display 114 and/or secondary display may optionally comprise a fixed display of any size or type that is physically separate from the handheld gaming machine 110. The handheld gaming machine 110 therefore comprise a remote wagering game input device to an area display, a gaming machine 10 display, a projection-type display (i.e., projected images on a solid, semi-solid, or fluid substrate or screen), or the like.

Likewise, although the discussion and examples above have centered on the use of the handheld gaming machine 110 to control an object in a video-based environment, the handheld gaming machine may also or alternatively be used to remotely control or influence physical objects. For example, upon the occurrence or a certain game condition, a player's handheld gaming machine 110 may be linked to a physical object, such as a 3-D rotating die, and the player permitted to control the movement of the physical object with the handheld gaming machine.

Each of these embodiments and obvious variations thereof is contemplated as falling within the spirit and scope of the claimed invention, which is set forth in the following claims.

What is claimed is:

1. A gaming system for playing a casino wagering game comprising:

a handheld gaming machine configured to display, on an electronic display device, play of the wagering game;

a wager-input device for receiving a wager to play the wagering game;

a wireless communication device;

a random element generator configured to generate one or more random elements;

at least one controller configured to initiate the wagering game in response to an electronic data signal from one of the wager-input device or a player input device corresponding to an instruction to conduct the wagering game, determine to an outcome of the casino wagering game based, at least in part, on the one or more random elements to direct the electronic display device to display the outcome; and to award a tangible award in response to the outcome meeting a predetermined award criterion; and a movement sensor communicatively coupled to said at least one controller, said movement sensor disposed in said handheld gaming machine to sense movements of said handheld gaming machine and to transmit output signals relating to said movements to said at least one controller, wherein the output signals relating to movement of the handheld gaming machine are used by said at least one controller to control a moveable player-controlled object within the wagering game during play of the wagering game, and wherein said at least one controller is configured to pass the moveable player-controlled object to a second handheld gaming machine playing the wagering game, responsive to at least one predefined movement of the handheld gaming machine during the play of the wagering game on the handheld gaming machine, responsive to a movement of the handheld gaming machine and a determination by the at least one controller that an output signal from the movement sensor corresponds to an occurrence of the at least one predefined movement, via a transmission using the wireless communication device.

2. A gaming system according to claim 1, further comprising the second handheld gaming machine, the second handheld gaming machine comprising a wager-input device, a wireless communication device, an electronic display device, and a movement sensor communicatively coupled to said at least one controller, said movement sensor disposed in the second handheld gaming machine to sense movements of the second handheld gaming machine and to transmit output signals relating to the movements to said at least one controller, wherein the output signals relating to movement of the second handheld gaming machine are used by said at least one controller to control a moveable player-controlled object within the wagering game during play of the wagering game on the second handheld gaming machine or to control the moveable player-controlled object received from the handheld gaming machine within the wagering game during play of the wagering game on the second handheld gaming machine, and wherein the at least one controller is configured to receive, on the second handheld gaming machine, the moveable player-controlled object passed from the handheld gaming machine, via a transmission using the wireless communication device.

3. A gaming system according to claim 2, wherein said at least one controller is external to at least one of the handheld gaming machine or the second handheld gaming machine.

4. A gaming system according to claim 2, wherein the at least one controller is configured to enable passing of the player-controlled object back and forth between the handheld gaming machine and the second handheld gaming machine, via a transmission using the wireless communication devices of the handheld gaming machine and the second handheld gaming machine.

5. A gaming system according to claim 2, wherein the at least one controller is configured to display, on the handheld gaming machine and on the second handheld gaming machine, a cooperative play wagering game wherein a game screen on the handheld gaming machine is related to a game screen on the second handheld gaming machine, and wherein the passing of the player-controller object from the handheld gaming machine to the second handheld gaming machine comprises a part of the cooperative play wagering game.

6. A gaming system according to claim 1, wherein said at least one controller comprises a first controller disposed within said handheld gaming machine and a second controller disposed within said second handheld gaming machine.

7. A gaming system according to claim 1, wherein said movement sensor is configured to determine movement of said handheld gaming machine about or along one or more axes with respect to an established reference.

8. A gaming system according to claim 7, wherein said reference comprises at least one of a position, spatial orientation, reaction, force, velocity, acceleration, electrical contact state, and characteristic at a first time from which a comparison of another position, reaction, force, velocity, acceleration, electrical contact state, or characteristic at a second time is possible.

9. A method of conducting a wagering game on a gaming system comprising a plurality of handheld gaming machines configured to play a casino wagering game, the gaming system comprising a random element generator and one or more controllers, each of the handheld gaming machines comprising an electronic display device and an electronic input device, the method comprising:

moving a first handheld gaming machine comprising a first movement sensor and a first wireless communication device;

outputting from the first movement sensor disposed in said first handheld gaming machine a signal corresponding to said act of moving;

determining a characteristic of movement represented by said signal;

controlling, via the one or more controllers, movement of a player-controllable object in said wagering game responsive to said characteristic of movement, and during play of the wagering game on the first handheld gaming machine, passing the moveable player-controlled object to a second handheld gaming machine concurrently playing the wagering game responsive to at least one predefined movement of the first handheld gaming machine and a determination by the controller that an output signal from the first movement sensor corresponds to an occurrence of the at least one predefined movement, via a transmission using the first wireless communication device, the second handheld gaming machine comprising a second movement sensor and a second wireless communication device.

10. A method of conducting a wagering game on a handheld gaming machine according to claim 9, wherein said one or more controllers is or are external to one of or both of the first handheld gaming machine and the second handheld gaming machine.

11. A method of conducting a wagering game on a handheld gaming machine according to claim 10, wherein an expected value of said wagering game is adjusted based on a player's level of skill.

12. A method of conducting a wagering game on a handheld gaming machine according to claim 10, wherein an outcome of said wagering game is adjusted responsive to an equalizing triggering event.

13. A method of conducting a wagering game on a handheld gaming machine according to claim 12, wherein said equalizing triggering event is responsive to a deviation of a player's performance from a standard measure of player performance.

14. A method of conducting a wagering game on a handheld gaming machine according to claim 13, wherein said equalizing triggering event comprises achieving an award in excess of a predetermined limit.

15. A method of conducting a wagering game on a handheld gaming machine according to claim 13, wherein said equalizing triggering event relates to a predetermined statistical deviation from an expected value for the wagering game.

16. A method of conducting a wagering game on a handheld gaming machine according to claim 9, wherein said one or more controllers comprise a plurality of controllers, with at least one controller being disposed within each of said first handheld gaming machine and said second handheld gaming machine.

17. A method of conducting a wagering game on a handheld gaming machine according to claim 16, wherein said movement sensor is configured to determine movement of the handheld gaming machine about or along one or more axes with respect to an established reference, and wherein said signal output in said act of outputting represents characteristics of movement about or along said one or more axes.

18. A method of conducting a wagering game on a handheld gaming machine according to claim 17, wherein said reference comprises at least one of a position, spatial orientation, reaction, force, velocity, acceleration, and electrical contact state.

19. A method of conducting a wagering game on a handheld gaming system configured to play a casino wagering game on a plurality of handheld gaming machines, the handheld gaming system comprising a random element generator and one or more controllers, each of the handheld gaming machines comprising an electronic display device and an electronic input device, the method comprising:

moving at least one of a first handheld gaming machine and a sub-portion thereof to output a signal corresponding to said act of moving from a movement sensor disposed in a corresponding one of said first handheld gaming machine and a sub-portion thereof;

determining, using the one or more controllers, a characteristic of movement represented by said signal;

controlling movement of a moveable player-controllable object, relative to a background graphic of the wagering game, in said wagering game during said wagering game played on the first handheld gaming machine, using the one or more controllers, responsive to said characteristic of movement;

determining, using the one or more controllers, if an equalizing trigger event is satisfied during play of the wagering game; and causing, using the one or more controllers, an equalizing event to occur during play of the wagering game to force an outcome consistent with an expected value of the wagering game.

20. A method of conducting a wagering game on a handheld gaming system according to claim 19, wherein said equalizing triggering event is responsive to a deviation of a player's performance from a standard measure of player performance.

21. A gaming system for playing a casino wagering game comprising:

a handheld gaming machine comprising an electronic display device, the handheld gaming machine being configured to play a wagering game responsive to a physical input from a player to initiate the wagering game, the wagering game comprising a skill-based component;

a wager-input device for receiving a wager to play a wagering game;

an electronic input device configured to receive a physical input from a player to initiate the wagering game and to transform the input into an electronic data signal;

a controller configured to initiate the wagering game in response to the electronic data signal from the electronic input device, to determine an outcome of the casino wagering game based, at least in part, on the one or more random elements, to direct the electronic display device to display the outcome and to award a tangible award in response to the outcome meeting a predetermined award criterion; and a movement sensor coupled to said at least one controller, said movement sensor disposed in said handheld gaming machine to sense movements of said handheld gaming machine and to transmit output signals relating to said movements to said at least one controller, wherein the output signals relating to movement of the handheld gaming machine are used by said controller to control a moveable player-controlled object during the skill-based component of the wagering game, and wherein the controller is configured to determine if an equalizing trigger event is satisfied during the skill-based component of the wagering game and, if an equalizing trigger event is satisfied, the controller is further configured to intervene in the wagering game in progress to cause an outcome consistent with an expected value of the wagering game to occur.

22. A gaming system according to claim 21, wherein said equalizing triggering event is responsive to a deviation of a player's performance during the skill-based component of the wagering game from a standard measure of player performance for the skill-based component of the wagering game.

23. A gaming system according to claim 21, wherein said equalizing triggering event comprises achieving an award in excess of a predetermined limit during the skill-based component of the wagering game.

24. A gaming system according to claim 23, wherein said equalizing triggering event relates to a predetermined statistical deviation from an expected value for the skill-based component of the wagering game.

* * * * *